(12) United States Patent
Jiang et al.

(10) Patent No.: US 6,939,464 B1
(45) Date of Patent: Sep. 6, 2005

(54) FUEL-WATER SEPARATOR UNIT WITH PARALLEL FLOW

(75) Inventors: Zemin Jiang, Cookeville, TN (US); John Clevenger, Antioch, TN (US)

(73) Assignee: Fleetguard, Inc., Nashville, TN (US)

( * ) Notice: Subject to any disclaimer, the term of this patent is extended or adjusted under 35 U.S.C. 154(b) by 128 days.

(21) Appl. No.: 10/315,391

(22) Filed: Dec. 10, 2002

Related U.S. Application Data

(63) Continuation-in-part of application No. 10/243,361, filed on Sep. 13, 2002.

(51) Int. Cl.$^7$ .................. B01D 27/00; B01D 27/08; B01D 35/00; B01D 35/30; B01D 35/18

(52) U.S. Cl. ............... 210/232; 210/238; 210/440; 210/450; 210/493.2; 210/184; 210/186

(58) Field of Search .................. 210/184, 186, 210/232, 440, 444, 450, 493.2

(56) References Cited

U.S. PATENT DOCUMENTS

| | | | |
|---|---|---|---|
| 2,168,125 A | 8/1939 | Hurn .................. 210/131 |
| 2,533,192 A | 12/1950 | Kennedy .................. 210/183 |
| RE23,604 E | 12/1952 | Schultz .................. 210/183 |
| 2,822,201 A | 2/1958 | Wood | |
| 2,873,029 A * | 2/1959 | Humbert, Jr. .................. 210/440 |
| 3,319,791 A | 5/1967 | Horne .................. 210/234 |
| 3,767,054 A | 10/1973 | Farrow et al. .................. 210/232 |
| 3,899,425 A * | 8/1975 | Lewis .................. 210/206 |
| 3,959,147 A | 5/1976 | Oakley et al. .................. 210/323 |
| 3,996,137 A | 12/1976 | Cooper .................. 210/130 |
| 4,091,265 A | 5/1978 | Richards et al. .................. 219/501 |
| 4,293,425 A * | 10/1981 | Price .................. 210/754 |
| 4,372,260 A * | 2/1983 | Baker .................. 123/142.5 E |
| 4,648,372 A * | 3/1987 | Michaud et al. .................. 123/557 |
| 4,664,088 A * | 5/1987 | Cantoni .................. 123/557 |
| 4,915,831 A | 4/1990 | Taylor .................. 210/232 |
| 5,084,170 A * | 1/1992 | Janik et al. .................. 210/232 |
| 5,211,846 A | 5/1993 | Kott et al. .................. 210/232 |
| 5,302,284 A * | 4/1994 | Zeiner et al. .................. 210/232 |
| 5,342,511 A | 8/1994 | Brown et al. .................. 210/137 |
| 5,354,464 A | 10/1994 | Slovak et al. .................. 210/240 |

(Continued)

FOREIGN PATENT DOCUMENTS

| | | | |
|---|---|---|---|
| DE | 3405719 | 8/1985 | .......... B01D 46/06 |

(Continued)

*Primary Examiner*—Thomas M. Lithgow
(74) *Attorney, Agent, or Firm*—Woodard, Emhardt, Moriarty, McNett & Henry LLP

(57) ABSTRACT

A filter assembly includes a housing and an inner post with a fluid inlet passage extending in the housing. An outer post surrounds the inner post to define a fluid outlet passage. A filter cartridge is received around the inner post and the outer post. The filter cartridge includes a filter element. A first endplate, which defines a first opening, is attached to a first end of the filter element. A first seal is received in the first opening to seal between the inner post and the first endplate. A second endplate, which defines a second opening, is attached to a second end of the filter element. A seal is received in the second opening to seal the outer post with the second endplate. The housing and the filter cartridge define an outer cavity. The fluid inlet passage opens into the outer cavity to minimize back flushing of contaminants.

17 Claims, 5 Drawing Sheets

U.S. PATENT DOCUMENTS

| | | | |
|---|---|---|---|
| 5,374,355 A | 12/1994 | Habiger et al. | 210/440 |
| 5,484,527 A * | 1/1996 | Janik et al. | 210/232 |
| 5,525,225 A * | 6/1996 | Janik et al. | 210/436 |
| 5,527,463 A | 6/1996 | Morgan, Jr. | 210/450 |
| 5,545,322 A | 8/1996 | Cheng | 210/440 |
| 5,556,542 A | 9/1996 | Berman et al. | 210/232 |
| 5,601,717 A | 2/1997 | Villette et al. | 210/493.1 |
| 5,753,117 A | 5/1998 | Jiang | 210/232 |
| 5,832,902 A * | 11/1998 | Davis et al. | 123/514 |
| 5,837,137 A * | 11/1998 | Janik | 210/232 |
| 5,891,336 A | 4/1999 | Vijlee et al. | 210/440 |
| 5,919,362 A | 7/1999 | Barnes et al. | 210/232 |
| 5,951,862 A | 9/1999 | Bradford | 210/305 |
| 6,016,923 A | 1/2000 | Baumann | 210/440 |
| 6,174,438 B1 | 1/2001 | Hodgkins et al. | 210/315 |
| 6,199,542 B1 * | 3/2001 | McKay | 123/557 |
| RE37,165 E | 5/2001 | Davis | 210/86 |
| 6,235,194 B1 | 5/2001 | Jousset | 210/206 |
| 6,238,554 B1 | 5/2001 | Martin et al. | |
| 6,328,889 B1 | 12/2001 | Bradford | 210/308 |
| 6,361,684 B1 * | 3/2002 | Hawkins et al. | 210/91 |
| 6,398,838 B1 | 6/2002 | Kaffenberger | 55/498 |
| 2002/0043491 A1 | 4/2002 | Janik et al. | 210/249 |
| 2004/0050766 A1 | 3/2004 | Jiang | |

FOREIGN PATENT DOCUMENTS

| | | | |
|---|---|---|---|
| EP | 1 008 375 A1 | 6/2000 | |
| GB | 912352 | 11/1960 | |
| GB | 1066341 | 4/1964 | |
| JP | 58-131117 | 8/1983 | B01D 46/24 |
| WO | WO 01/85304 A1 | 11/2001 | B01D 35/00 |
| WO | WO 03/043714 A1 | 5/2003 | |

* cited by examiner

FUEL-WATER SEPARATOR UNIT WITH PARALLEL FLOW

REFERENCE TO RELATED APPLICATION

The present application is a Continuation-In-Part patent application of U.S. patent application Ser. No. 10/243,361 filed Sep. 13, 2002 entitled FILTER CARTRIDGE WITH FLOATING SEAL, which is hereby incorporated by reference in its entirety.

BACKGROUND OF THE INVENTION

The present invention generally relates to filter assemblies and more specifically, but not exclusively, concerns a filter with parallel fluid flow.

Filters are used in a wide variety of environments in order to filter particulate matter out of fluid. For instance, filters are used to filter particulates from both oil and fuel in engines in order to prolong the life of the engine. Conventional filter cartridge designs usually incorporate a cylindrical-shaped filter cartridge that defines a center post cavity in which a center post is received. In one typical flow pattern, the fluid is filtered by flowing through the cartridge from the outside of the cartridge to the inside of the cartridge. Usually, the fluid being filtered flows in a counter flow direction, that is the unfiltered fluid on the outside of the filter cartridge flows in one direction, while the filtered fluid in the center post cavity flows in the opposite direction. For example, when a filter cartridge with the counter flow design has a vertical orientation, the unfiltered fluid can flow in an upward direction along the outside of the filter cartridge, and the filtered fluid that is inside the center post cavity drains in a downward direction. With this counter flow filter cartridge, the pressure differential across filter media in the cartridge increases from top to bottom. For instance, the highest pressure differential is created at the bottom of the cartridge; while the lowest differential pressure is created at the top of the cartridge. The portion of the filter cartridge that has the highest pressure differential (i.e., the bottom of the filter cartridge) tends clog at a higher rate as compared to the remainder of the cartridge. As should be appreciated, this uneven pressure differential distribution allows the bottom filter media to become plugged first, such that the filter cartridge progressively clogs in an upward direction. Overt time, the effective surface area of the cartridge that can filter fluid reduces, thereby hastening the progression of clogging of the filter such that the life of the filter is rapidly reduced. Another disadvantage of the counter flow filter design, especially with fuel filters, is that the counter fluid flow disturbs the water in the filter's sump that has been already separated from the fuel such that the water and any contaminants in the water are reintroduced into the fuel. This reintroduction of water reduces fuel-water separation efficiency as well as the overall filtering efficiency of the filter cartridge.

Another problem faced with fuel filters is associated with contaminated, unfiltered fuel in the cartridge draining back into the system. Once the engine is turned off, the unfiltered fluid picks up additional contaminants from the filter media and back flushes these contaminants into the fuel system, thereby further contaminating the fuel system. Typical fuel filters require a check or ball valve in order to prevent this back flushing of contaminated fuel. However, such check valves can stick and be rendered useless if not properly maintained. Moreover, the check valves increase both the manufacturing and maintenance costs associated with the filter.

In the operation of diesel engines, fuel temperature is a critical parameter that needs to be measured. If the temperature of the diesel fuel becomes too low, the diesel fuel can become highly viscous, thereby preventing the engine from operating properly. Therefore, it has been critical to be able to monitor and control the temperature of the fuel. In typical designs, a thermostat is placed in the fuel stream in order to monitor the temperature of the fuel. A seal is generally required in order to prevent fuel leakage from the stream. Over time, this seal can deteriorate such that the seal leaks and contaminates the fuel system, which can be detrimental to engine performance.

Fuel additives are sometimes added to the fuel in order to improve the engine performance. However, over or under supply of the fuel additive can adversely affect engine performance. Controlling the supply rate of fuel additives, while critical, can be rather difficult. Typical fuel additive systems require complicated valving and other systems for controlling the supply rate of the additive.

SUMMARY OF THE INVENTION

One aspect of the present invention concerns a filter assembly that includes a housing that defines a filter cartridge cavity. An inner post extends in the filter cartridge cavity, and the inner post defines a fluid inlet passage. An outer post surrounds the inner post to define a fluid outlet passage. A filter cartridge is received around the inner post and the outer post. The filter cartridge includes a filter element received around the inner post to filter a fluid. The filter element has a first end and a second end. A first end plate is attached to the first end of the filter element, and the first end plate defines a first opening. A first seal is received in the first opening to seal between the inner post and the first end plate. A second end plate is attached to the second end of the filter element, and the second end plate defines a second opening. A second seal is received in the second opening to seal between the outer post and the second end plate. The filter cartridge divides the filter cartridge cavity into an outer cavity and an inner cavity. The outer cavity is defined by the housing and the filter cartridge. The filter cartridge defines the inner cavity, in which the inner post extends at least from the second end to the first end of the filter element. The fluid inlet passage of the inner post opens into the outer cavity at the first end to minimize back flushing of contaminants from the filter element.

Another aspect concerns a filter assembly that includes a filter cartridge to filter a fluid and a filter head. The filter head defines a fluid inlet port to supply the fluid in an unfiltered state to the filter cartridge and a fluid outlet port to discharge the fluid in a filtered state from the filter cartridge. The fluid inlet port and the fluid outlet port are fluidly coupled to one another via a fluid passageway. A coolant passageway is positioned proximal the fluid passageway to supply coolant for controlling the temperature of the fluid. A thermostat is positioned in the coolant passageway to determine temperature of the fluid based on coolant temperature.

A further aspect concerns a filter assembly that includes a filter housing, which defines a filter cavity. A filter cartridge is positioned in the filter cavity to filter fluid. A filter cap encloses the filter housing, and the filter cap includes an additive container that defines an additive cavity to contain an additive. The filter cap includes an additive passageway fluidly coupling the additive cavity to the filter cavity for supplying the additive to the fluid.

Further forms, objects, features, aspects, benefits, advantages, and embodiments of the present invention will become apparent from a detailed description and drawings provided herewith.

DESCRIPTION OF THE SELECTED EMBODIMENTS

Figure 2:
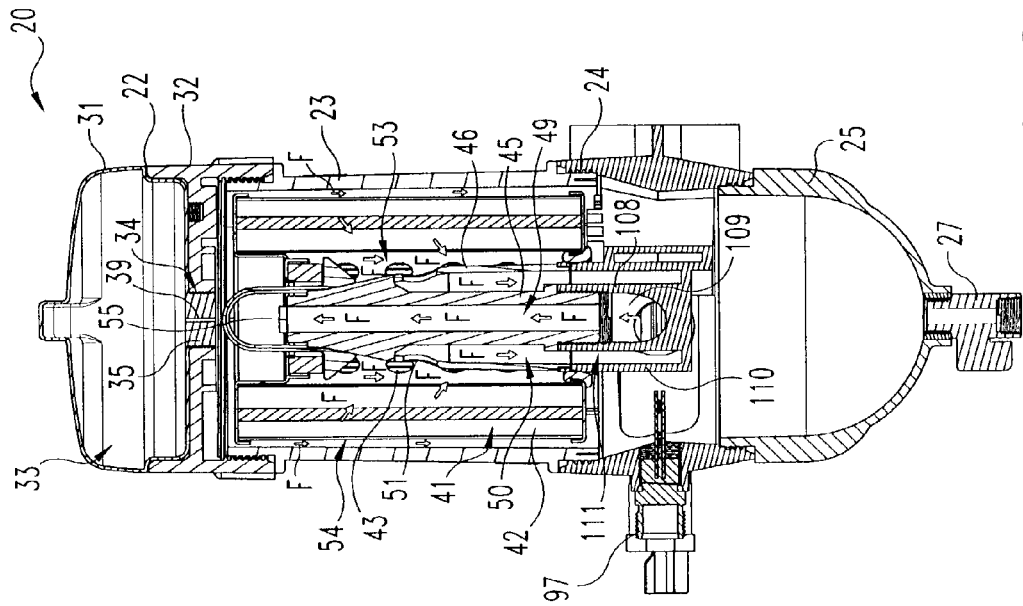
FIG. 2 is a cross sectional view taken along line 2—2 of the FIG. 1 filter assembly.

For the purposes of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Figure 1:
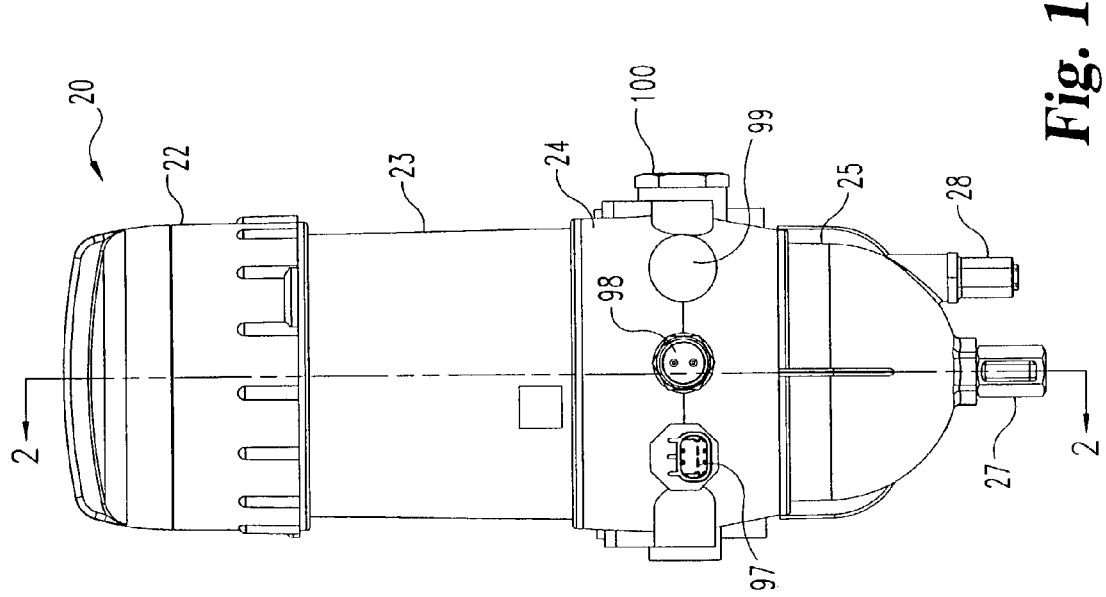
FIG. 1 is a front view of a fuel filter assembly according to one embodiment of the present invention.
Figure 3:
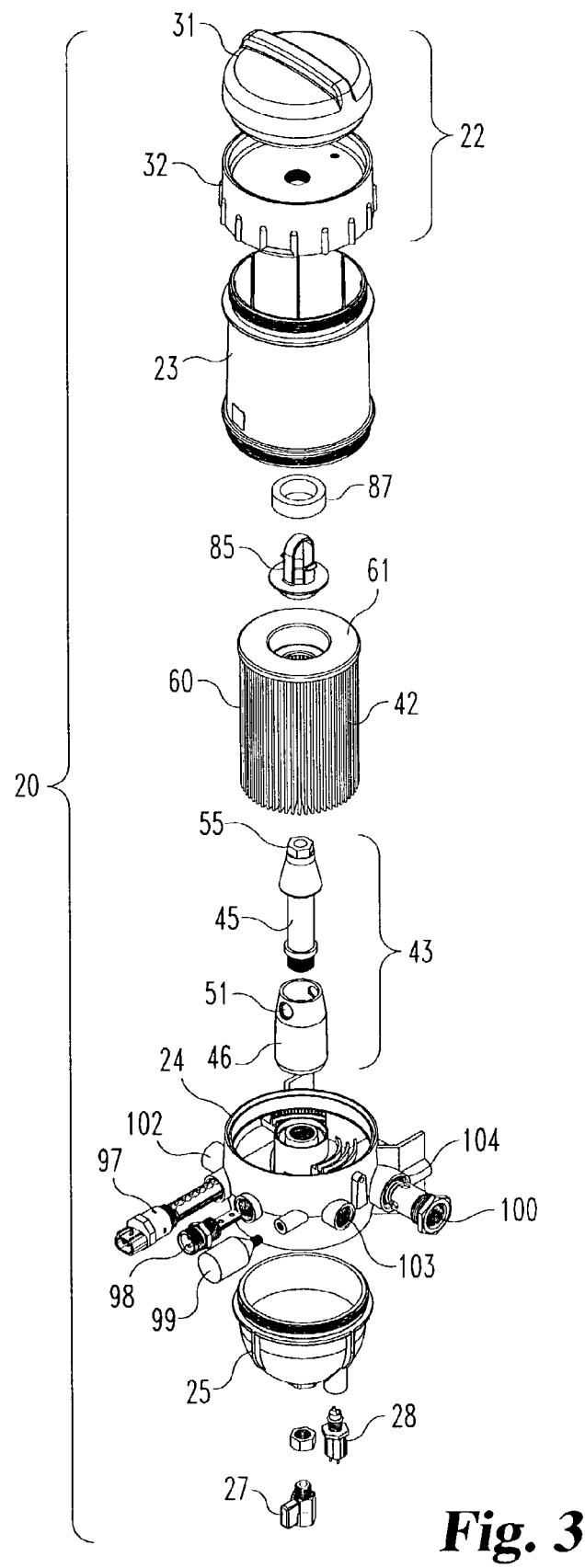
FIG. 3 is an exploded view of the FIG. 1 filter assembly.

A filter assembly 20 according to one embodiment, among others, of the present invention is illustrated in FIGS. 1–3. The filter assembly 20 will be described with reference to a fuel filtering environment, but it should be appreciated that many features described herein can be applied to other fields in which other types of fluids, such as oil, are filtered. As shown in FIG. 1, the filter assembly 20 includes an additive cap assembly 22 threadedly mounted on a housing 23. In one form of the present invention, the housing 23 is formed from a clear plastic such that the mechanic or other technician is able to view the condition of the filter cartridge inside the filter assembly 20. A filter head 24 supplies and collects fuel in the filter assembly 20 as well as distributes the coolant in order to control fuel temperature. As illustrated, the housing 23 is threadedly mounted on the filter head 24. In one form, the filter head 24 is formed from cast aluminum, but it is contemplated that filter head 24 can be formed from other materials. A collection bowl or sump 25 is threaded onto the filter head 24 on the end opposite the filter housing 23. Referring to FIG. 1, the collection bowl 25 includes a drain valve 27 for draining water from the collection bowl 25 and a water level sensor 28 for sensing the water level in the collection bowl 25.

As depicted in FIG. 2, the additive cap assembly 22 includes an additive container 31, which is threadedly coupled to a cap member 32. The additive container 31 defines an additive cavity 33 in which the fuel additive is stored. Cap member 32 defines an opening 34 in which an additive supply member 35 of the additive container 31 is received. In the illustrated embodiment, the additive supply member 35 is threadedly secured in opening 34. The additive member 35 defines an additive supply passage 39 through which the additive flows from the additive cavity 33 into the filter housing 23. The additive supply passage 39 is sized to control the flow rate of the additive into the filtered fluid. In essence, the size of the additive supply passage 39 controls the drip or supply rate of the additive into the fuel supply. By increasing the size of the additive supply passage 39, the flow rate of the additive can be increased. In contrast, reducing the size of additive supply passage reduces the supply rate. In one embodiment, the filter assembly 20 is positioned in an upright position, as is shown in FIG. 2, such that the additive is supplied through a gravity feed. This construction eliminates a number of components that are needed for regulating the amount of additive supplied to the fuel. For instance, flow control valves are no longer needed to control the additive flow rate and flow direction.

As shown in FIG. 2, the cap assembly 22, housing 23, and filter head 24 define a filter cavity 41 in which a filter cartridge 42 is received around a dual center post 43. Referring to FIGS. 2 and 3, the dual center post 43 includes an inner center post 45 that is surrounded by an outer center post 46. The inner center post 45 defines an inner fluid passage 49, while both the inner center posts 45 and the outer center posts 46 define an outer fluid passage 50. As illustrated in FIG. 2, the outer center post 46 has a pair of outlet ports or openings 51 through which fluid flows into the outer fluid passage 50. As shown, the inner center post 45 is threadedly engaged with the filter head 24 in the illustrated embodiment. The outer center post 46 is sandwiched between the inner center post 45 and the filter head 24. The filter cartridge 42 divides the filter cavity 41 into an inner cavity portion 53 and an outer cavity portion 54. As illustrated in FIG. 2, outlet opening 55 of the inner fluid passage 49 opens directly into the outer cavity portion 54 of the filter assembly 20. As will be appreciated from the discussion below, this construction minimizes the back flushing of contaminants from the filter cartridge 42 into the fuel system.

Figure 4:
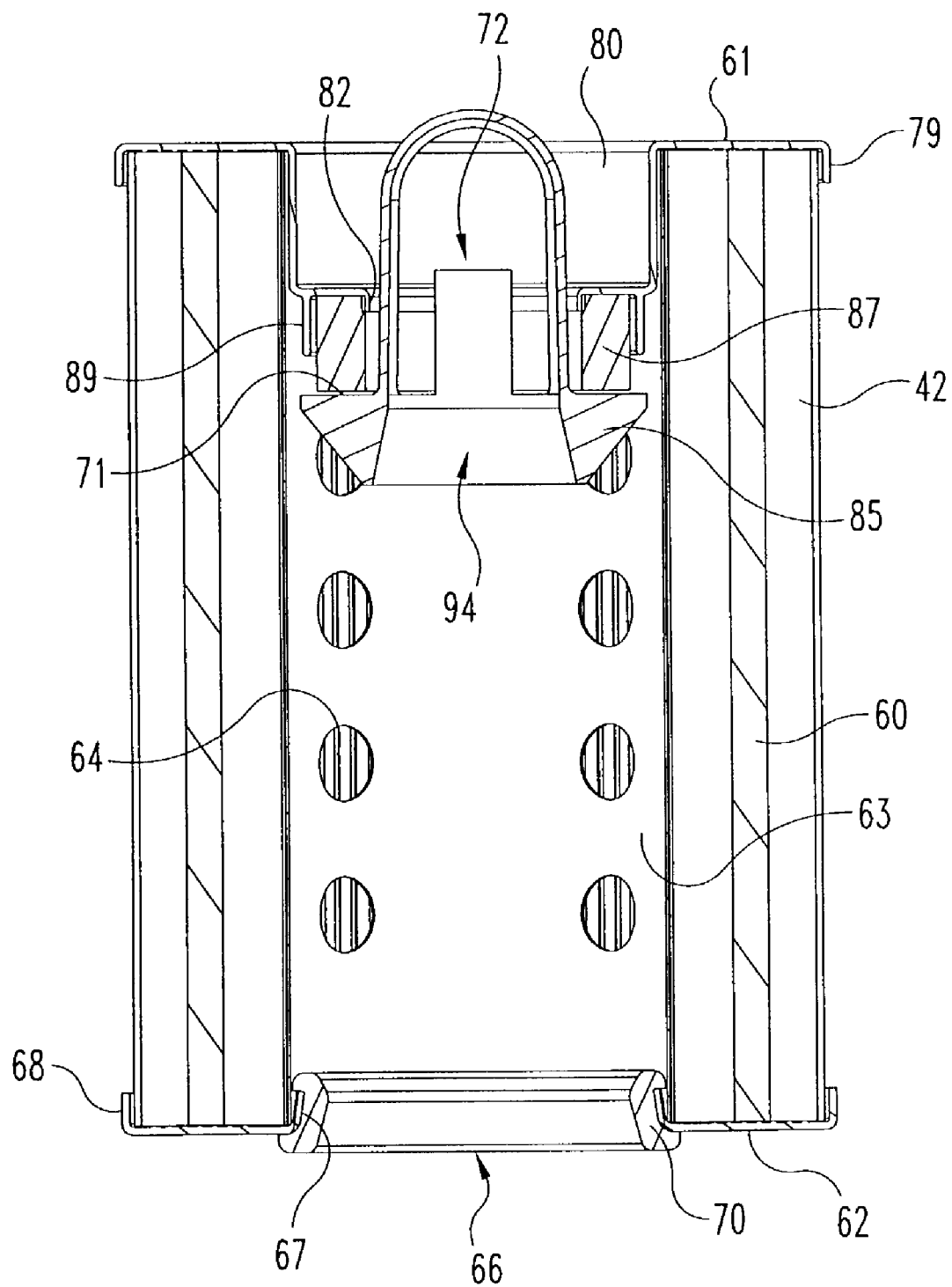
FIG. 4 is a cross sectional view of a filter cartridge used in the FIG. 1 filter assembly.
Figure 5:
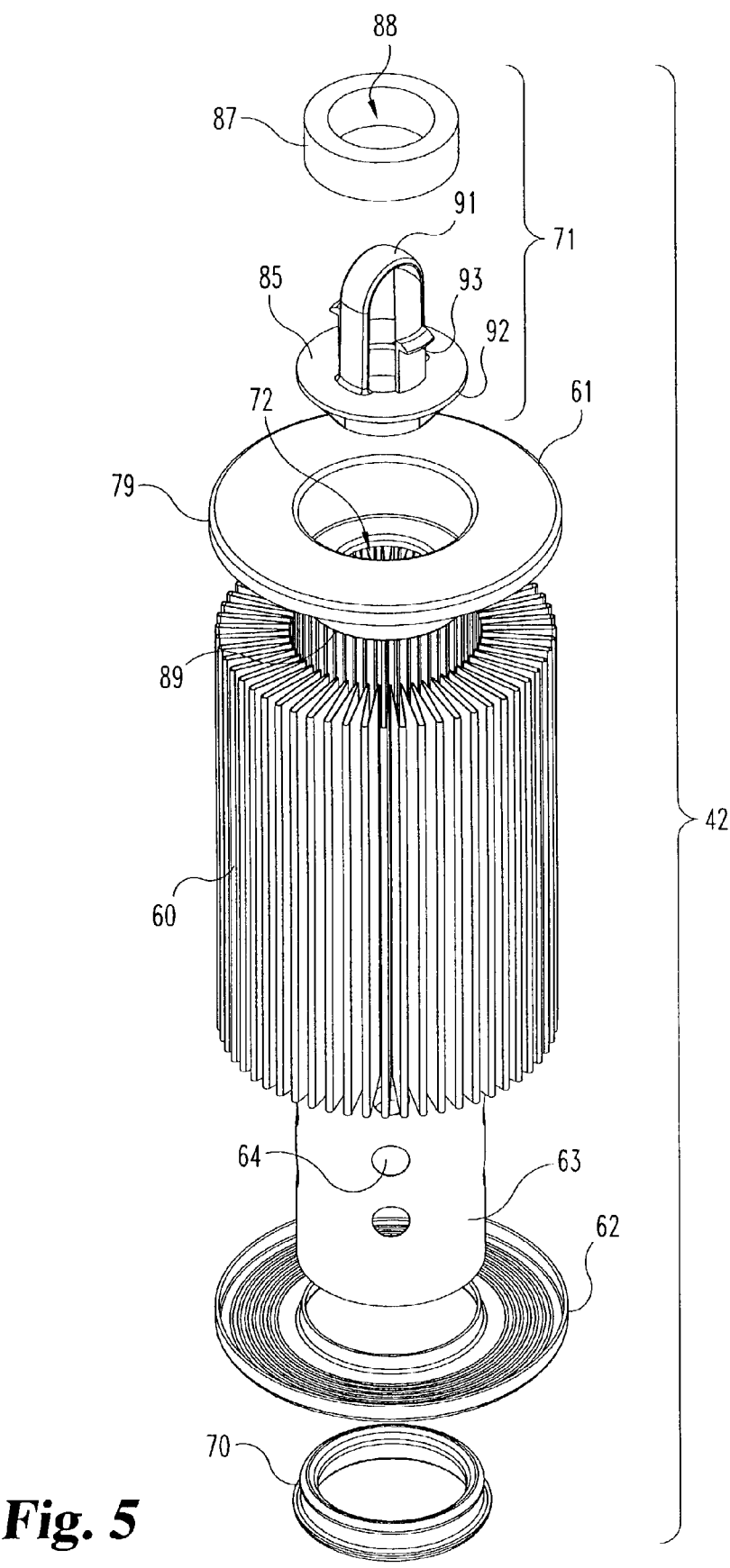
FIG. 5 is an exploded view of the FIG. 4 filter cartridge.

The filter cartridge 42, according to one embodiment of the present invention, is illustrated in FIGS. 4 and 5. As depicted, the filter cartridge 42 includes a filter element or media 60 as well as first 61 and second 62 endplates attached at opposite ends of the filter element 60. Inside the filter element 60, a centertube 63 extends from the first endplate 61 to the second endplate 62. One or more centertube openings 64 are defined in the centertube 63. The endplates 61, 62 are attached to the filter element or media 60 in one embodiment through an adhesive. It should be appreciated, however, that endplates 61, 62 can be attached to the filter media 60 in other generally known manners. As shown in FIG. 4, the second endplate 62 defines a center post opening 66. The second endplate 62 further incorporates an inner flange 67 that surrounds center post opening 66 and an outer flange 68 that surrounds the filter media 60. The filter media 60 is attached between the inner flange 67 and the outer flange 68. In the illustrated embodiment, a fixed seal 70 is received in the center post opening 66 in the second endplate 62. As depicted in FIG. 4, the fixed seal 70 is attached to the second endplate 62 through the inner flange 67.

At the first endplate 61, a floating seal assembly 71 is received in a first endplate center post opening 72 that is defined in the first endplate 61. An outer flange 79 of the first endplate 61 surrounds an end portion of the filter media 60. The first endplate 61 further includes a central recessed portion 80 that surrounds the inner center post opening 72. At the recessed portion 80, the first endplate 61 has an indented shape. As shown in FIG. 4, an inner flange 82 on the first endplate 61 surrounds the inner center post opening 72. In the illustrated embodiment, a portion of the floating seal assembly 71 is attached to the first inner center post opening 72. With reference to FIG. 5, the floating seal 71 includes a gasket retainer or body 85, a gasket 87 with a gasket opening 88, and an outer support member 89. In one embodiment, the gasket 87 is formed from an elastic material, such as rubber, and the gasket retainer 85 is formed from a rigid or semi-rigid material, such as plastic. The gasket 87 in the illustrated embodiment has a rectangular cross sectional shape. However, it should be appreciated that the gasket 87 can have a different cross sectional shape. As illustrated in FIG. 4, the gasket retainer 85 is clipped to the first endplate 61, thereby retaining the gasket 87 against the first endplate 61. The outer support member 89 is used to resist radial expansion of the gasket 87. In the illustrated embodiment, the outer support member 89 has a generally cylindrical shape, although other shapes are contemplated in other embodiments. Further in the illustrated embodiment, the outer support member 89 is integrally formed with the first endplate 61. In other embodiments, the outer support member 89 can be formed as a separate component and/or integrally formed with the gasket retainer 85. Moreover, in other embodiments, where fluid pressure is greater on the outside of the gasket 87, for example if the fluid flow direction is reversed, the support member 89 can be positioned inside the gasket 87 to resist inward compression of the gasket 87.

As shown in further detail in FIG. 5, the gasket retainer 85 has a handled member 91 attached to a retainer flange 92. The filter cartridge 42 can be grasped through the handle member 61 such that the cartridge 42 can be easily installed and replaced. The retainer flange 92 supports the gasket 87 and compresses the gasket 87 against the first endplate 61 when the cartridge 42 is installed. In one form of the present invention, the handle member 91 has a generally U shape, and the retainer flange 92 has a generally circular shape. However, as should be appreciated, these components can be shaped differently. In FIG. 5, the gasket retainer 85 further includes a pair of oppositely disposed retainer clips 93 that extend parallel to the handle member 91 from the retainer flange 92. The retainer clips 93 secure the floating seal assembly 71 to the first endplate 61 inside the first center post opening 72. As shown in FIG. 4, the retainer flange 92 defines an inner center post cavity 94 in which the inner center post 45 is received. In the illustrated embodiment, the inner center post cavity 94 is constructed to seal against the inner center post 45. As illustrated, the inner center post cavity 94 has a generally frustoconical shape which coincides with the shape of the head of the inner center post 45. The frustoconical or angled inner surface of the inner center post opening 94 allows the gasket retainer 85 to reposition and align itself with the inner center post 45 when the cartridge 42 is installed. The overall construction of the floating seal assembly 71 allows for compensation of misalignment between the inner center post 45 and the outer center post 46 such that a seal is formed at both ends of the filter cartridge 42.

Figure 6:
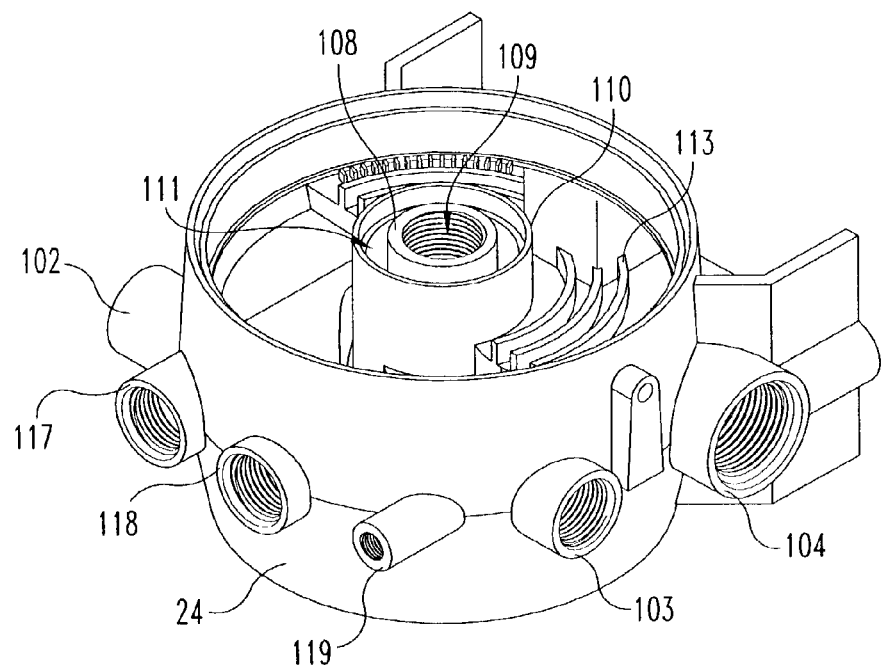
FIG. 6 is a perspective view of a filter head incorporated in the FIG. 1 filter assembly.
Figure 7:
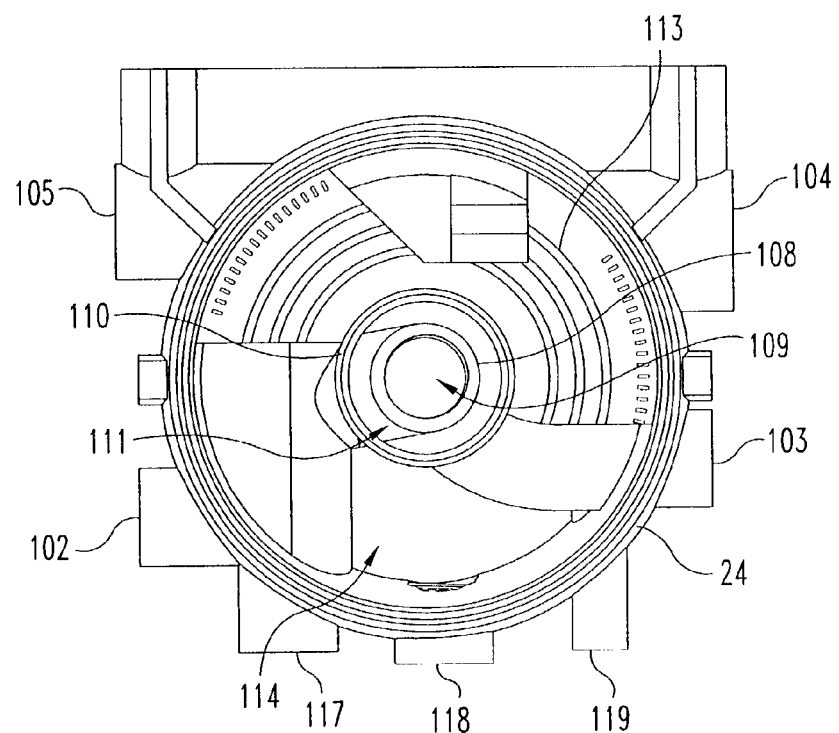
FIG. 7 is a top view of the FIG. 6 filter head.

Referring again to FIG. 3, the filter head 24 houses a number of components for heating and maintaining the temperature of the fluid being filtered, which in this example is a fuel, such as diesel fuel. As shown, the filter head 24 houses a main fluid heater 97, an auxiliary fluid heater 98, a filter life minder 99, and a coolant thermostat 100. The main fluid heater 97 receives its power from the engine, whereas the auxiliary fuel heater receives power through a secondary source, such as an electrical outlet. In one embodiment, the main fluid heater 97 includes a 12-volt DC fuel heater, and the auxiliary fluid heater 98 includes a 120-volt AC fuel heater. The filter life minder 99 is used to monitor the life of the filter cartridge 42. As depicted in FIGS. 3, 6, and 7, the filter head 24 includes a number of openings through which fluid flows and in which various components are mounted. As shown, the filter head 24 has a fluid inlet port 102, a fluid outlet port 103, a coolant inlet port 104, and a coolant outlet port 105. Fluid that is to be filtered, such as fuel, is supplied via the fluid inlet port 102. After the fuel has been filtered, the now-filtered fuel exits the filter assembly 20 via the fluid outlet port 103. Heated coolant from the engine, which is used to heat the fuel, is supplied via coolant inlet port 104, and the coolant is discharged via coolant outlet port 105. It is contemplated, however, that in other embodiments the coolant may be used to cool the fluid being filtered. As shown in FIG. 7, the filter head 24 has an inner fluid supply member 108 that defines an inner filter head passage 109. The inner filter head passage 109 is fluidly coupled to the fluid inlet port 102. As depicted in FIG. 2, one end of the inner center post 45 is threadedly secured to the inner fluid supply member 108. The inner fluid passage 49 in the inner center post 45 is in fluid communication with the inner filter head passage 109.

As further illustrated in FIG. 7, the filter head 24 includes an outer fluid supply member 110 that surrounds the inner fluid supply member 108, and together the inner 108 and outer 110 fluid supply members define an outer filter head passage 111. The outer filter head passage 111 is fluidly coupled to the fluid outlet port 103. Moreover, as shown in FIG. 2, the outer fluid passage 50 in the dual center post 43 is fluidly coupled to the outer filter head passage 111. Referring to FIGS. 6 and 7, the filter head 22 further includes one or more heat exchange vanes 113 for exchanging heat between the fuel and the coolant. In one particular application, the coolant inlet port 104 supplies heated coolant from a diesel engine in order to heat the diesel fuel being filtered. In FIG. 7, the filter head 24 further defines a collection bowl passageway 114 through which water that has been separated from the fuel can flow into the collection bowl 25. As depicted in FIGS. 3 and 7, the filter head 24 further includes a main heater port 117 in which the main fluid heater 97 is received. The main heater 97 extends within the main heater port 117 to intercept the fuel from fluid inlet port 102. The auxiliary heater 98 is attached in the auxiliary heater port 118 in the filter head 24, and the life minder 99 is attached to the life minder port 119. In the embodiment illustrated in FIG. 3, the filter head 24 has the coolant thermostat 100 received in the coolant inlet port 104. This eliminates the need for providing seals around thermostat 100, which tend to deteriorate, leak and contaminate the fluid being filtered. As previously mentioned, certain fluids, like diesel fuel, tend to destroy seals. As the seal deteriorates, the fuel can become contaminated with the corroded seal. As should be appreciated, by placing thermostat 100 in the coolant inlet port 104, the temperature of the fuel being filtered can be determined based on the temperature of the coolant, while at the same not requiring special sealing to prevent fluid contamination. By enhancing the heat exchange between the fuel and coolant, the vanes 113 in the illustrated embodiment improve the accuracy of the temperature reading for the fuel.

The operation of the filter assembly 20 will now be described with reference to FIGS. 2 and 7. Although in the operational description below concerns filtering fuel, it should be appreciated that other types of fluids can be filtered in a similar manner. In assembly 20, the fuel is supplied via fluid inlet port 102. As the fuel travels through the fluid inlet port 102, the main fluid heater 97 heats the fuel. Further, the coolant traveling through the coolant inlet port 104 can be used to heat the fuel. As mentioned above, the temperature of the fuel is monitored through thermostat 100, which is positioned in the coolant flow path so as to reduce the likelihood of fuel contamination. Next, the fuel travels through the inner filter head passage 109 and into the inner fluid passage 49 in the inner center post 45. The fuel then is discharged from the outlet opening 55 directly into the outer cavity portion 54. The floating seal 71 prevents the fuel from circumventing filtration by the filter cartridge 42. As shown, the fuel is discharged via outlet opening 155 along the first endplate 61. By having the fluid discharged directly into the outer cavity portion 54, a check valve for preventing back flow of the fuel is no longer required because the unfiltered fuel does not back flush contaminants from the filter media 60 into the fuel system when the engine is not operating. As should be appreciated, elimination of the check valve reduces the cost and improves the reliability of the filter assembly 20.

The fuel in the outer cavity portion 54 flows through and is filtered by the filter media 60. Once filtered, the fuel flows into the inner cavity portion 53 of the filter cartridge 42. Water removed from the fuel by the filter cartridge 42 is drained into the collection bowl 25. The dual center post design of the present invention allows for parallel fluid flow, that is the unfiltered fuel flowing in the outer cavity portion 54 flows in the same direction as the filtered fuel draining from the inner cavity portion 53. As mentioned above, counter fluid flow design filters create uneven pressure differentials along the filter cartridge, which in turn reduces the life of cartridge. With the parallel flow arrangement of the present invention, however, the pressure differential along the filter media 60 is uniform such that the filer cartridge 24 does not become progressively clogged in the manner as describe above for the counter flow filter cartridge designs. In the present parallel flow design, all portions of the filter media 60 generally bear the same filtering load throughout the life of the filter cartridge 42. Moreover, the parallel flow design reduces the amount of water and contaminants that are mixed back into the fuel. In the illustrated embodiment, droplets of the water that has been separated from the fuel flows along the filter media 60, thereby flushing contaminants off the filter media 60 and into the collection bowl 25. The water as well as the contaminants now suspended in the water drain into the collection bowl 25 in the same direction that the fuel travels in the outer cavity portion 54 of the housing 53. The fuel flow carries droplets of the water into the collection bowl 25. This creates uniform flow pattern, which in turn reduces disturbances of the water and contaminants in the collection bowl 25. Moreover, this flushing of contaminants off the filter media 60 by the water increases the operational life of the filter cartridge 42. From the inner cavity portion 53, the now-filtered fuel flows through outer opening 51 in the outer center post 46 and into the outer fluid passage 50. The fuel then flows into the outer filter head passage 111 and is discharged from the filter cartridge assembly 20 via the fluid outlet port 103.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A filter assembly, comprising:
   a housing defining a filter cartridge cavity;
   an inner post extending in said filter cartridge cavity, said inner post defining a fluid inlet passage;
   an outer post surrounding said inner post to define a fluid outlet passage;
   a filter cartridge received around said inner post and said outer post, said filter cartridge including
      a filter element received around said inner post to filter a fluid, said filter element having a first end and a second end,
      a first end plate attached to said first end of said filter element, said first end plate defining a first opening,
      a first seal received in said first opening to seal between said inner post and said first end plate,
      a second end plate attached to said second end of said filter element, said second end plate defining a second opening,
      a second seal received in said second opening to seal between said outer post and said second end plate,
      wherein said filter cartridge divides said filter cartridge cavity into an outer cavity and an inner cavity, said outer cavity being defined by said housing and said filter cartridge, said filter cartridge defining said inner cavity in which said inner post extends at least from said second end to said first end of said filter element, and
      wherein said fluid inlet passage of said inner post opens into said outer cavity at said first end to minimize back flushing of contaminants from the filter element; and
   wherein said first seal includes a floating seal assembly, said floating seal assembly including
      a retainer sealing around said post, said retainer having a flange extending from said retainer,
      a gasket sealing against said flange and said first end plate, and
      at least a pair of retainer clips extending from said retainer to secure said retainer to said first end plate.

2. The filter assembly of claim 1, wherein said retainer has a handle member extending through said fist opening in first said end plate.

3. The filter assembly of claim 1, further comprising a support member surrounding said gasket to resist expansion of said gasket.

4. The filter assembly of claim 3, wherein said support member is attached to said end plate.

5. The filter assembly of claim 1, wherein said housing includes a filter head that includes:
   a fluid inlet passage for supplying the fluid to said filter cartridge;
   a fluid outlet passage for discharging the fluid from said filter cartridge;
   a coolant passage for supplying coolant to control the temperature of the fluid; and
   a thermostat positioned in said coolant passage to monitor the temperature of the fluid.

6. The filter assembly of claim 1, wherein:
   said filter housing has a cap; and
   said cap includes an additive container to supply an additive to the fluid.

7. The filter assembly of claim 6, wherein the filter housing includes a collection bowl.

8. A filter assembly, comprising:
   a filter cartridge to filter a fluid;
   a filter head defining;
   a fluid inlet port to supply the fluid in an unfiltered state to said filter cartridge;
   a fluid outlet port to discharge the fluid in a filtered state from said filter cartridge;

said fluid inlet port and said fluid outlet port being fluidly coupled to one another via a fluid passageway; and a coolant passageway positioned proximal said fluid passageway to supply coolant for controlling the temperature of the fluid;

a thermostat positioned in said coolant passageway to determine temperature of the fluid based on coolant temperature; and wherein said filter head includes one or more heat exchange vanes for exchanging heat between the coolant and the fluid.

9. The filter assembly of claim 8, further comprising:

an inner post extending from said filter head, said inner post defining a fluid inlet passage that is in fluid communication with said fluid inlet port;

an outer post surrounding said inner post to define a fluid outlet passage that is in fluid communication with said fluid outlet port; and wherein said filter cartridge defines an inner cavity and said inner post extends through said inner cavity to minimize back flushing of contaminants from said filter cartridge.

10. The filter assembly of claim 8, further comprising:

a filter housing enclosing said filter cartridge; and wherein said filter housing has a cap, and said cap includes an additive container to supply an additive to the fluid.

11. The filter assembly of claim 8, further comprising:

wherein said filter head defines a main heater port, an auxiliary heater port and a life minder port;

a main heater received in said main heater port for heating the fluid;

an auxiliary heater received in said auxiliary heater port for heating the fluid; and a life minder positioned in said life minder port for monitoring the life of the cartridge.

12. The filter assembly of claim 11, wherein said filter head includes a level sensor and a drain valve.

13. A filter assembly, comprising:

a filter housing defining a filter cavity;

a filter cartridge positioned in said filter cavity to filter fluid;

a filter cap enclosing said filter housing, said filter cap including an additive container defining an additive cavity to contain an additive, said filter cap including an additive passageway fluidly coupling said additive cavity to said filter cavity for supplying the additive to the fluid;

wherein said filter cartridge defines an inner cavity;

an inner post extending inside inner cavity, said inner post defining a fluid inlet passage and said inner post extends through said inner cavity to minimize back flushing of contaminants from said filter cartridge; and an outer post surrounding said inner post to define a fluid outlet passage.

14. The filter assembly of claim 13, wherein said housing includes a filter head that includes:

a fluid inlet passage for supplying the fluid to said filter cartridge;

a fluid outlet passage for discharging the fluid from said filter cartridge;

a coolant passage for supplying coolant to control the temperature of the fluid; and a thermostat positioned in said coolant passage to monitor the temperature of the fluid.

15. A filter assembly, comprising:

a housing defining a filter cartridge cavity;

an inner post extending in said filter cartridge cavity, said inner post defining a fluid inlet passage;

an outer post surrounding said inner post to define a fluid outlet passage;

a filter cartridge received around said inner post and said outer post, said filter cartridge including a filter element received around said inner post to filter a fluid, said filter element having a first end and a second end, a first end plate attached to said first end of said filter element, said first end plate defining a first opening, a first seal received in said first opening to seal between said inner post and said first end plate, a second end plate attached to said second end of said filter element, said second end plate defining a second opening, a second seal received in said second opening to seal between said outer post and said second end plate, wherein said filter cartridge divides said filter cartridge cavity into an outer cavity and an inner cavity, said outer cavity being defined by said housing and said filter cartridge, said filter cartridge defining said inner cavity in which said inner post extends at least from said second end to said first end of said filter element, and wherein said fluid inlet passage of said inner post opens into said outer cavity at said first end to minimize back flushing of contaminants from the filter element; and wherein said first seal includes a floating seal assembly, said floating seal assembly including a retainer sealing around said post, said retainer having a flange extending from said retainer, wherein said retainer has a handle member extending through said first opening in first said end plate, and a gasket sealing against said flange and said first end plate.

16. A filter assembly, comprising:

a housing defining a filter cartridge cavity;

an inner post extending in said filter cartridge cavity, said inner post defining a fluid inlet passage;

an outer post surrounding said inner post to define a fluid outlet passage;

a filter cartridge received around said inner post and said outer post, said filter cartridge including a filter element received around said inner post to filter a fluid, said filter element having a first end and a second end, a first end plate attached to said first end of said filter element, said first end plate defining a first opening, a first seal received in said first opening to seal between said inner post and said first end plate, a second end plate attached to said second end of said filter element, said second end plate defining a second opening, a second seal received in said second opening to seal between said outer post and said second end plate, wherein said filter cartridge divides said filter cartridge cavity into an outer cavity and an inner cavity, said outer cavity being defined by said housing and said filter cartridge, said filter cartridge defining said inner cavity in which said inner post extends at least from said second end to said first end of said filter element, and wherein said fluid inlet passage of said inner post opens into said outer cavity at said first end to minimize back flushing of contaminants from the filter element; and wherein said housing includes a filter head that includes
- a fluid inlet passage for supplying the fluid to said filter cartridge,
- a fluid outlet passage for discharging the fluid from said filter cartridge,
- a coolant passage for supplying coolant to control the temperature of the fluid, and
- a thermostat positioned in said coolant passage to monitor the temperature of the fluid.

17. A filter assembly, comprising:

a housing defining a filter cartridge cavity;

an inner post extending in said filter cartridge cavity, said inner post defining a fluid inlet passage;

an outer post surrounding said inner post to define a fluid outlet passage;

a filter cartridge received around said inner post and said outer post, said filter cartridge including
- a filter element received around said inner post to filter a fluid, said filter element having a first end and a second end,
- a first end plate attached to said first end of said filter element, said first end plate defining a first opening,
- a first seal received in said first opening to seal between said inner post and said first end plate,
- a second end plate attached to said second end of said filter element, said second end plate defining a second opening,
- a second seal received in said second opening to seal between said outer post and said second end plate, wherein said filter cartridge divides said filter cartridge cavity into an outer cavity and an inner cavity, said outer cavity being defined by said housing and said filter cartridge, said filter cartridge defining said inner cavity in which said inner post extends at least from said second end to said first end of said filter element, and wherein said fluid inlet passage of said inner post opens into said outer cavity at said first end to minimize back flushing of contaminants from the filter element; and wherein said filter housing has a cap, said cap including an additive container to supply an additive to the fluid.

* * * * *

UNITED STATES PATENT AND TRADEMARK OFFICE
CERTIFICATE OF CORRECTION

PATENT NO. : 6,939,464 B1
DATED : September 6, 2005
INVENTOR(S) : Jiang et al.

It is certified that error appears in the above-identified patent and that said Letters Patent is hereby corrected as shown below:

<u>Column 8,</u>
Line 62, please change "defining;" to -- defining --.
Lines 64 and 67, please change "cartridge;" to -- cartridge, --.

<u>Column 9,</u>
Line 2, please change "passageway; and" to -- passageway, and --.

Signed and Sealed this

Eighth Day of November, 2005

JON W. DUDAS
*Director of the United States Patent and Trademark Office*